United States Patent
Lee et al.

(10) Patent No.: US 10,160,325 B2
(45) Date of Patent: Dec. 25, 2018

(54) VEHICLE POWER CONTROL METHOD AND SYSTEM FOR JUMP-START

(71) Applicant: HYUNDAI MOTOR COMPANY, Seoul (KR)

(72) Inventors: Ho Joong Lee, Anyang-si (KR); Jee Heon Kim, Guri-si (KR); Hee Tae Yang, Seoul (KR); Won Kyoung Choi, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 329 days.

(21) Appl. No.: 15/139,757

(22) Filed: Apr. 27, 2016

(65) Prior Publication Data

US 2017/0158058 A1 Jun. 8, 2017

(30) Foreign Application Priority Data

Dec. 3, 2015 (KR) ........................ 10-2015-0171810

(51) Int. Cl.
*B60L 3/00* (2006.01)
*H02J 1/00* (2006.01)
(Continued)

(52) U.S. Cl.
CPC ......... *B60L 3/0046* (2013.01); *B60L 11/1811* (2013.01); *B60L 11/1816* (2013.01);
(Continued)

(58) Field of Classification Search
None
See application file for complete search history.

(56) References Cited

U.S. PATENT DOCUMENTS

2001/0004205 A1* 6/2001 Miller ................... H02J 7/1423
323/224
2002/0140397 A1* 10/2002 Hasegawa ............. H02J 7/1423
320/104

FOREIGN PATENT DOCUMENTS

JP 2008-309041 A 12/2008
JP 2012-152003 A 8/2012
(Continued)

OTHER PUBLICATIONS

Machine Translation of JP 2012152003 A.*
Korean Office Action issued in Application No. 10-2015-0171810 dated Mar. 2, 2017.

*Primary Examiner* — David V Henze-Gongola
(74) *Attorney, Agent, or Firm* — McDermott Will & Emery LLP

(57) ABSTRACT

A vehicle power control method for jump-start uses a vehicle control system that includes a low voltage DC/DC converter for converting a voltage of a high voltage battery to a low voltage to be output and a junction box for connecting the low voltage DC/DC converter to an auxiliary battery and load. The vehicle power control method includes a jump-start preparation step in which when the auxiliary battery is in a discharge condition, a first relay, which connects or disconnects the junction box to or from the auxiliary battery, is turned off and a second relay, which connects or disconnects the junction box to or from a jump-start power supply connection terminal, is turned on; and a jump-start completion step in which, after a vehicle starts by a power inputted through the jump-start power supply connection terminal, the second relay is turned off, and the first relay is turned on.

8 Claims, 2 Drawing Sheets

(51) Int. Cl.
*H02J 7/00* (2006.01)
*B60L 11/18* (2006.01)
*F02N 11/14* (2006.01)

(52) U.S. Cl.
CPC .......... *B60L 11/1868* (2013.01); *F02N 11/14* (2013.01); *H02J 1/00* (2013.01); *H02J 7/0031* (2013.01); *H02J 7/0054* (2013.01); *H02J 2001/006* (2013.01); *H02J 2007/0039* (2013.01)

(56) References Cited

FOREIGN PATENT DOCUMENTS

| | | | | |
|---|---|---|---|---|
| JP | 2012152003 | A | * | 8/2012 |
| JP | 2014-187731 | A | | 10/2014 |
| KR | 10-2001-0111135 | A | | 12/2001 |

* cited by examiner

VEHICLE POWER CONTROL METHOD AND SYSTEM FOR JUMP-START

CROSS REFERENCE TO RELATED APPLICATION

The present application claims the benefit of priority to Korean Patent Application No. 10-2015-0171810, filed on Dec. 3, 2015, the entire content of which is incorporated herein for all purposes by this reference.

TECHNICAL FIELD

The present disclosure generally relates to a method for controlling vehicle power for jump-start, and a system for the same. More particularly, the present disclosure relates to a method for controlling vehicle power for jump-start, capable of preventing an auxiliary battery and a relay from being damaged when jump-starting a vehicle due to discharge of the auxiliary battery, and a system for the same.

BACKGROUND

Electric vehicles or fuel cell vehicles, which are eco-friendly vehicles, include a low voltage battery in order to supply power required to start the vehicles and to supply power to electric field loads that operate at low voltage.

When the low voltage battery in a vehicle is a lithium battery, the battery must be prevented from being fully discharged due to its own characteristics. Therefore, if a state of charge of an auxiliary battery is lower than a certain voltage, electrical connection between the auxiliary battery and a vehicle system is interrupted by a relay. In order to restart the vehicle while the electrical connection is interrupted, the relay needs to be manually turned on to make the electrical connection. When the auxiliary battery is excessively discharged, the vehicle needs to be jump-started using an external power supply.

Conventionally, when a discharged auxiliary battery is charged by connecting an external power supply thereto and power is supplied to a vehicle electric field load to jump-start a vehicle, the auxiliary battery may be damaged by overcurrent or overvoltage applied from the external power supply connected for the jump-start.

Further, since there is no an additional control process for stably controlling the electrical system of a vehicle in the conventional art, when jump-start is performed after a relay that sets the electrical connection of an auxiliary battery is turned off, the jump-start may not be performed or the vehicle may be shut down.

The foregoing is intended merely to aid in the understanding of the background of the present invention, and is not intended to mean that the present invention falls within the purview of the related art that is already known to those skilled in the art.

SUMMARY

The present disclosure is intended to propose a method for controlling vehicle power for jump-start, which is used in emergency starting of a vehicle, and preventing an auxiliary battery and a relay from being damaged by fire that is attributable to jump-start, and a system for the same.

According to one embodiment in the present disclosure, a vehicle power control method for jump-start using a vehicle power system that includes a low voltage DC/DC converter for converting a voltage of a high voltage battery into a low voltage to be output and a junction box for connecting an output terminal of the low voltage DC/DC converter to an auxiliary battery and load includes: a jump-start preparation step in which when the auxiliary battery is in a discharge condition, a first relay is turned off and a second relay is turned on, the first relay electrically connecting or disconnecting the junction box to or from the auxiliary battery, and the second relay electrically connecting or disconnecting the junction box to or from a jump-start power supply connection terminal; and a jump-start completion step in which, after a vehicle starts by a power inputted through the jump-start power supply connection terminal, the second relay is turned off and the first relay is turned on.

On and off states of the first relay and the second relay may be determined to be mutually exclusive.

The jump-start completion step may include an LDC control step in which a third relay, which is connected between the high voltage battery and the low voltage DC/DC converter, is turned on and an output of the low voltage DC/DC converter is controlled. In the LDC control step, the low voltage DC/DC converter is controlled to continue outputting.

The method for controlling vehicle power for jump-start further includes a current limitation step in which a current supplied from the low voltage DC/DC converter to the auxiliary battery is limited to be equal to or less than a threshold value, after the jump-start completion step.

According to another embodiment in the present disclosure, a vehicle power control system for jump-start includes a low voltage DC/DC converter for converting a voltage of a high voltage battery into a low voltage to be output; a junction box connected to an output terminal of the low voltage DC/DC converter; an auxiliary battery connected to the low voltage DC/DC converter via the junction box; a first relay for electrically connecting or disconnecting the junction box to or from the auxiliary battery; a jump-start power supply connection terminal connected to the low voltage DC/DC converter via the junction box; a second relay for connecting or disconnecting the junction box to or from the jump-start power supply connection terminal; and a controller configured to control the first relay, the second relay, and the low voltage DC/DC converter. When the auxiliary battery is in a discharge condition, the controller turns off the first relay, which electrically connects or disconnects the junction box to or from the auxiliary battery, and turns on the second relay, which connects or disconnects the junction box to or from the jump-start power supply connection terminal. After a vehicle starts by a power inputted through the jump-start power supply connection terminal, the controller turns off the second relay and turns on the first relay.

The controller may determine on and off states of the first relay and the second relay to be mutually exclusive.

After the vehicle starts by the power inputted through the jump-start power supply connection terminal, the controller may turn on a third relay, which is connected between the high voltage battery and the low voltage DC/DC converter, and may control an output of the low voltage DC/DC converter while controlling the low voltage DC/DC converter to continue outputting.

After the second relay is turned off and the first relay is turned on, the controller may limit a current supplied from the low voltage DC/DC converter to the auxiliary battery to be equal to or less than a threshold value.

According to another embodiment in the present disclosure, a vehicle power control method for jump-start includes: a jump-start preparation step in which when an auxiliary battery is in a discharge condition, a first relay, which is connected between the auxiliary battery and an output terminal of a low voltage DC/DC converter, is turned off, and simultaneously, a second relay, which is connected between a jump-start power supply connection terminal and an output terminal of the low voltage DC/DC converter, is turned on; and a jump-start completion step in which, after a vehicle is started using power input through the jump-start power supply connection terminal, the second relay is turned off, and simultaneously, the first relay is turned on.

According to still another embodiment in the present disclosure, a vehicle power control system for jump-start includes: a first relay connected between an auxiliary battery and an output terminal of a low voltage DC/DC converter and determining an electrical connection state between the auxiliary battery and the output terminal of the low voltage DC/DC converter; a second relay connected between a jump-start power supply connection terminal and an output terminal of the low voltage DC/DC converter and determining an electrical connection state between the jump-start power supply connection terminal and the output terminal of the low voltage DC/DC converter; and a controller for controlling on and off states of the first relay and the second relay to be mutually exclusive based on a state of charge of the auxiliary battery and a vehicle ignition state through the jump-start.

According to the vehicle power control method and system for jump-start, an auxiliary battery and a relay connected thereto may be prevented from being damaged by fire that is attributable to overcurrent flowing into the discharged auxiliary battery when jump-start of a vehicle is performed. Further, when another vehicle is connected to a power supply connection terminal that is additionally equipped for jump-start, its internal devices may be prevented from failure or malfunction, which may be caused by supplying overcurrent to the vehicle having the discharged auxiliary battery.

Furthermore, since a low voltage DC/DC converter is controlled to continue outputting when a relay connected to a discharged auxiliary battery is turned off in the jump-start process, a vehicle may be prevented from being shut down.

Additionally, the method and system for controlling vehicle power for jump-start controls a low voltage DC/DC converter by applying control methods for limiting output current after jump-start is terminated. Therefore, overcharge current may be prevented from being input to an auxiliary battery that has low open circuit voltage (OCV) due to the discharged state thereof.

BRIEF DESCRIPTION OF THE DRAWINGS

The above and other objects, features and other advantages of the present disclosure will be more clearly understood from the following detailed description when taken in conjunction with the accompanying drawings.

DETAILED DESCRIPTION

Hereinbelow, a method and system for controlling vehicle power for jump-start according to various embodiments in the present disclosure will be described in detail with reference to the accompanying drawings.

Figure 1:
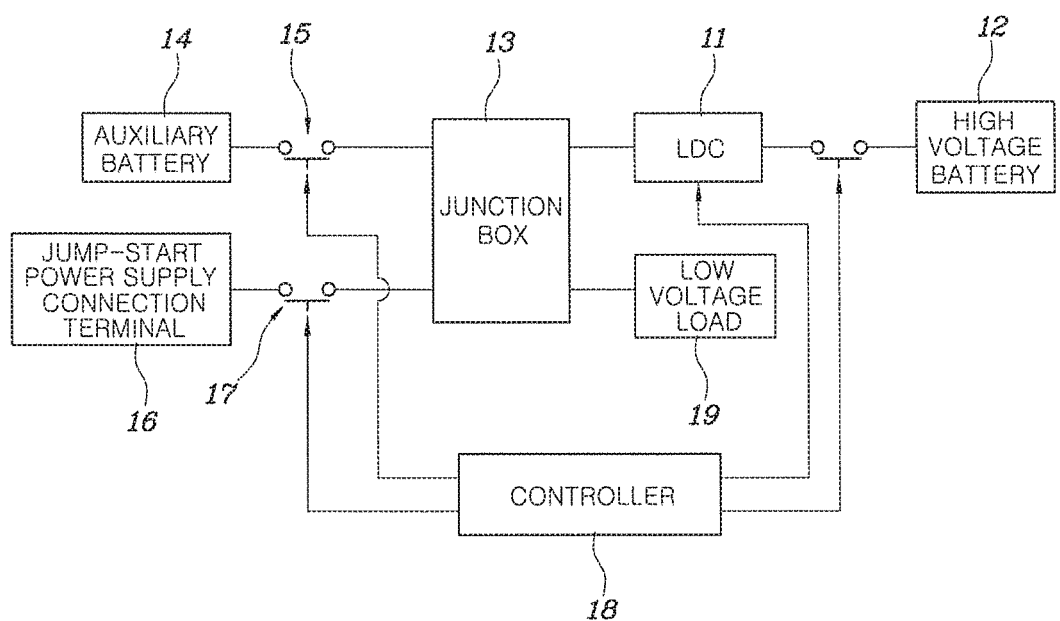
FIG. 1 is a block diagram of a vehicle power control system for jump-start according to an embodiment in the present disclosure.

FIG. 1 is a block diagram of a vehicle power control system for jump-start according to an embodiment in the present disclosure.

As illustrated in FIG. 1, a vehicle power control system for jump-start according to an embodiment in the present disclosure may include a low voltage DC/DC converter (LDC) 11 for converting a voltage of a high voltage battery 12 into a low voltage to be output, a junction box 13 connected to an output terminal of the LDC 11, an auxiliary battery 14 connected to the LDC 11 via the junction box 13, a first relay 15 for electrically connecting/disconnecting the junction box 13 to/from the auxiliary battery 14, a jump-start power supply connection terminal 16 connected to the LDC 11 via the junction box 13, a second relay 17 for connecting/disconnecting the junction box 13 to/from the jump-start power supply connection terminal 16, and a controller 18 for controlling the first relay 15, the second relay 17, and the LDC 11.

The LDC 11 is a component that converts high voltage power received from the high voltage battery 12 into low voltage power and outputs the low voltage power. The high voltage battery 12 is a component equipped in an electric vehicle or a fuel cell vehicle in order to supply the high voltage power for driving a motor (not illustrated), which is a main power source of the vehicle, and a high voltage auxiliary machinery (not illustrated). The LDC 11 converts the high voltage power, which is output from the high voltage battery 12, into the low voltage power and charges the auxiliary battery 14, which uses low voltage, or supplies power to low voltage load 19.

The junction box 13 electrically connects the LDC 11 to various components that are supplied with the output power of the LDC 11. Through the junction box 13, the output terminal of the LDC 11 may be electrically connected to the auxiliary battery 14, the low voltage load 19, and the like.

The multiple connection terminals included in the junction box 13 may be electrically connected to each other. Therefore, multiple devices connected to the junction box 13 may also be electrically connected to each other.

The auxiliary battery 14 is a component that stores electric power in order to output the low voltage power (for example, 12 V), and a lithium battery is generally used. The auxiliary battery 14 may supply power that is required to start a vehicle, and may occasionally supply power to the low voltage load 19 while the vehicle is driven.

According to the present disclosure, the system for controlling vehicle power for jump-start, the vehicle can be jump-started by supplying power from an external power supply when the auxiliary battery 14 is in a discharged state, i.e., a state in which the auxiliary battery cannot supply voltage required to start the vehicle.

The system for controlling vehicle power for jump start according to the present disclosure further includes the jump-start power supply connection terminal 16, which is connected to the junction box 13, for the vehicle jump-start. The jump-start power supply connection terminal 16 may be connected to the output terminal of the LDC 11 via the junction box 13. Through the electrical connection between connection terminals of the junction box 13, the jump-start power supply connection terminal 16 may be electrically connected to the auxiliary battery 14 and the low voltage load 19.

The first relay 15 sets the electrical connection between the auxiliary battery 14 and the junction box 13, and the second relay 17 sets the electrical connection between the jump-start power supply connection terminal 16 and the junction box 13. The controller 18 may control on and off states of the first relay 15 and the second relay 17. The on and off states may determine the electrical connection between the auxiliary battery 14 and the output terminal of the LDC 11 and the electrical connection between the jump-start power supply connection terminal 16 and the output terminal of the LDC 11.

The controller 18 may control the operations of various components required to jump-start the vehicle. That is, the controller 18 may control the on and off states of the first relay 15 and the second relay 17, and the operation of the LDC 11.

Here, the controller 18 does not mean a single controller for a specific device. The controller may be understood as comprising one or more controllers capable of communicating with each other, and may serve to receive information for overall power control of a vehicle, calculate and store necessary information, and output control commands for the operations of various devices using the calculated information.

An operation of the vehicle power control system according to the present disclosure is implemented by the control process of the above-mentioned controller 18 of the vehicle power control system. Therefore, through the description of the vehicle power control method, which will be described below, the operation and effect of the vehicle power control system according the present disclosure may be clearly understood.

Figure 2:
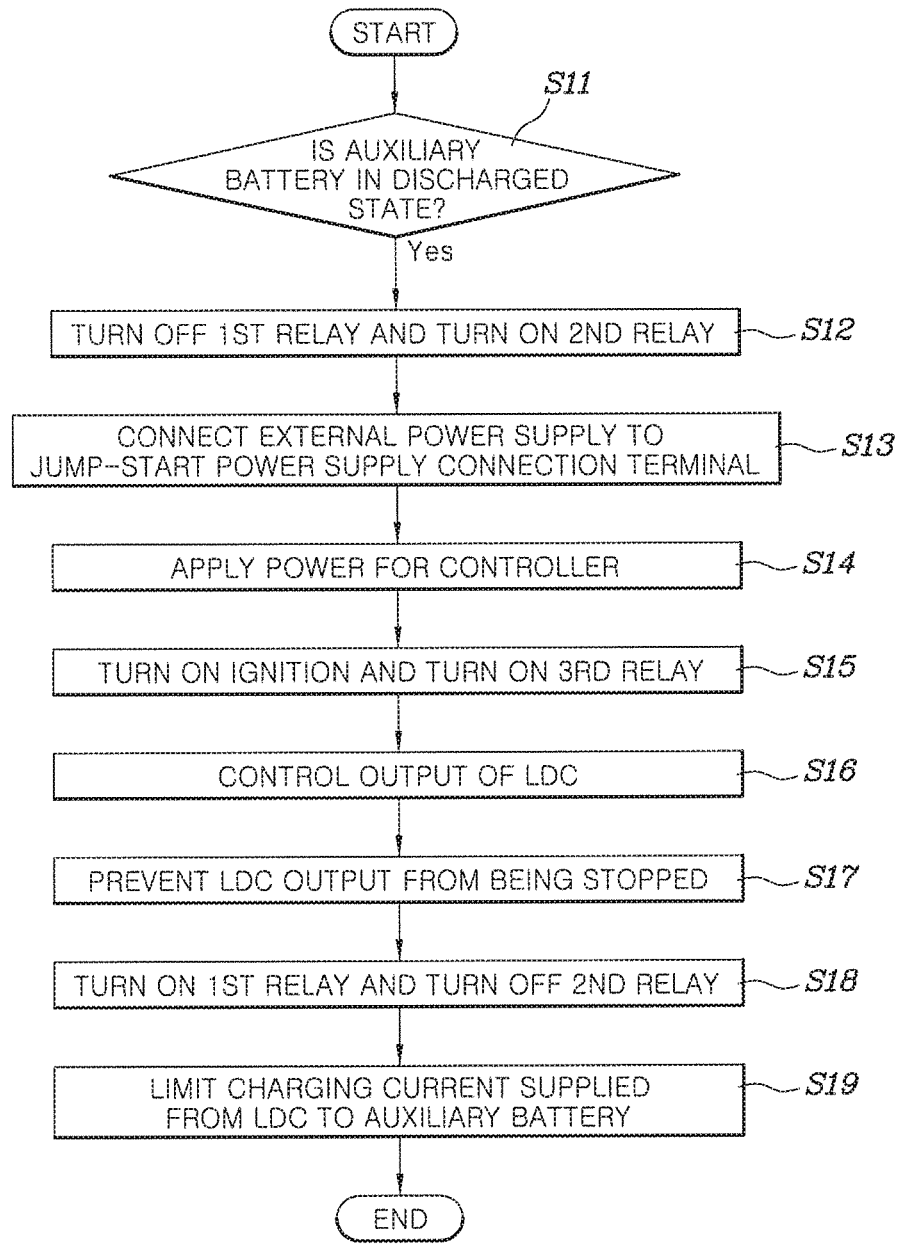
FIG. 2 is a flowchart of a vehicle power control method for jump-start according to an embodiment in the present disclosure.

FIG. 2 is a flowchart of a vehicle power control method for jump-start according to an embodiment in the present disclosure.

First, the controller 18 monitors an output voltage of the auxiliary battery 14 and determines whether the auxiliary battery 14 is in a discharged state at step S11. At step S11, the output voltage of the auxiliary battery 14 may be monitored by the controller 18 checking the magnitude of the out voltage sensed by a voltage sensor (not illustrated) installed in the output terminal of the auxiliary battery 14. Since the controller 18 has the function of monitoring the voltage of the auxiliary battery 14, it may be understood as a controller that comprises a battery management system (BMS).

When it is determined that the auxiliary battery 14 is in the discharged state, the controller 18 turns off the first relay 15 so as to disconnect the auxiliary battery 14 from the junction box 13, that is, interrupt the electrical connection between the auxiliary battery 14 and the LDC 11), and simultaneously, turns on the second relay 17 so as to electrically connect the jump-start power supply connection terminal 16 to the junction box 13, that is, electrically connect the jump-start power supply connection terminal 16 to the LDC 11 at step S12.

Then, an external power supply is connected to the jump-start power supply connection terminal 16 at step S13.

As described above, before connecting the external power supply to the jump-start power supply connection terminal 16 at step S12, the controller 18 turns off the first relay 15 and turns on the second relay 17 depending on the discharge state of the auxiliary battery 14. Accordingly, when the external power supply is connected to the jump-start power supply connection terminal 16, the power supplied from the external power supply may be prevented from being supplied to the auxiliary battery 14, which is in the discharged state. Particularly, the controller 18 turns off the second relay 17 when the first relay 15 is turned on, and off the first relay 15 when the second relay 17 is turned on. In other words, the controller 18 controls on and off states of the first relay 15 and the second relay 17 to be mutually exclusive. Therefore, the electrical connection between the auxiliary battery 14 and the jump-start power supply connection terminal 16 may be prevented.

Therefore, when the external power supply is connected to the jump-start power supply connection terminal 16 at step S13, it is possible to prevent the auxiliary battery 14 and the first relay 15 from being damaged due to fire when overcurrent suddenly flows into the discharged auxiliary battery 14. Further, when another vehicle is connected to the jump-start power supply connection terminal 16, its internal devices may be prevented from failure or malfunction, which may be caused by supplying the overcurrent to the vehicle having the discharged auxiliary battery 14.

Subsequently, the external power supply, connected to the jump-start power supply connection terminal 16, applies B+ power (regular power) and ignition power to the vehicle having the discharged auxiliary battery 14, whereby power is supplied to various devices required for starting the vehicle at step S14. Further, the vehicle manually starts by a driver, and the controller 18 turns on a third relay (main relay), connected between the high voltage battery 12 and the LDC 11. Thus, the power of the high voltage battery 12 is input to the LDC 11 at step S15.

Then, the controller 18 starts to control the output of the LDC 11. Accordingly, the power output from the LDC 11 is supplied to the low voltage load 19 at step S16.

In particular, when the first relay 15 is turned off, the controller 18 prevents control for stopping the output of the LDC 11 from being performed at step S17, so that the vehicle may be prevented from being shut down. The controller 18 may use various methods for controlling the LDC 11, example, the output of the LDC 11 is controlled by determining a burst mode. The control method based on the burst mode is a method in which when the output load of the LDC 11 is a light load that is less than a predetermined magnitude, the output of the LDC 11 stops to increase fuel efficiency of the vehicle.

In the present disclosure, when jump-start using an external power supply is performed because a vehicle cannot start by the auxiliary battery 14 that is in the discharged state, the controller 18 turns off the first relay 15 in order to disconnect the auxiliary battery 14 from the junction box 13. Therefore, when a control method for stopping the output of the LDC 11, such as the burst mode control, is applied, the vehicle may be shut down since the output of the LDC 11 stops. In order to prevent this situation, the controller 18 prevents control that stops the output of the LDC 11 from being performed when the first relay 15 is turned off.

When the ignition is turned on by the power supplied by the LDC 11, the first relay 15 is turned on to supply power to the auxiliary battery 14, and the second relay 17 is turned off to disconnect the jump-start power supply connection terminal 16 from the junction box 13 at step S18.

The controller 18 controls the LDC 11 to perform derating and limiting charging current in order to make the current supplied from the LDC 11 to the auxiliary battery 14 equal to or less than a predetermined threshold value in consideration of an open circuit voltage (OCV) of the discharged auxiliary battery 14 is low, at step S19. Since the auxiliary battery 14 in the discharged state has a low OCV, when power is supplied thereto, overcharge current may be input. Accordingly, the LDC 11, which supplies power, may output overcurrent. In order to prevent the overcharge current from being input and prevent overcurrent from being output, the controller 18 may control the LDC 11 by applying control methods that are capable of limiting the current output from the LDC 11.

As described above, the method and system for controlling vehicle power for jump-start according to the various embodiments in the present disclosure may prevent the auxiliary battery and the relay connected thereto from being damaged by fire that is attributable to overcurrent flowing into the discharged auxiliary battery when jump-start of the vehicle is performed. Further, when another vehicle is connected to the jump-start power supply connection terminal, its internal devices may be prevented from failure or malfunction, which may be caused by supplying overcurrent to the vehicle having the discharged auxiliary battery.

Furthermore, since control for stopping the output of a low voltage DC/DC converter is not performed under the condition in which a relay connected to a discharged auxiliary battery is turned off in a jump-start process, the vehicle may be prevented from being shut down.

In addition, the method and system for controlling vehicle power for jump-start according to the various embodiments in the present disclosure controls a low voltage DC/DC converter by applying control methods for limiting the output current after the jump-start is terminated, whereby overcharge current may be prevented from being input to an auxiliary battery that has a low OCV due to the discharged state thereof.

Although exemplary embodiments in the present disclosure has been described for illustrative purposes, those skilled in the art will appreciate that various modifications, additions, and substitutions are possible, without departing from the scope and spirit of the invention as disclosed in the accompanying claims.

What is claimed is:

1. A vehicle power control method for jump-start using a vehicle power system which includes a DC/DC converter for converting a voltage of a main battery into a lower voltage, which has a lower value than the voltage of the main battery, to be output and a junction box for connecting an output terminal of the DC/DC converter to an auxiliary battery and a voltage load, the method comprising:
   a jump-start preparation step in which when the auxiliary battery is in a discharge condition, a first relay is turned off and simultaneously a second relay is turned on, the first relay electrically connecting or disconnecting the junction box to or from the auxiliary battery, and the second relay electrically connecting or disconnecting the junction box to or from a jump-start power supply connection terminal;
   a jump-start completion step in which, after an ignition of a vehicle is turned on using a power inputted through the jump-start power supply connection terminal, the second relay is turned off and the first relay is turned on; and
   a current limitation step in which a current supplied from the DC/DC converter to the auxiliary battery is limited to be equal to or less than a threshold value in consideration of an open circuit voltage (OCV) of the auxiliary battery,
   wherein the jump-start completion step comprises a DC/DC converter control step in which a third relay, which is connected between the high voltage battery and the low voltage DC/DC converter, is turned on and an output of the DC/DC converter is controlled,
   wherein in the DC/DC converter control step, the DC/DC converter is controlled to continue outputting.

2. The vehicle power control method of claim 1, wherein on and off states of the first relay and the second relay are mutually exclusive.

3. A non-transitory computer-readable recording medium comprising computer executable instructions execution of which causes a controller to perform the vehicle power control method of claim 1.

4. A vehicle power control system for jump-start, comprising:
   a DC/DC converter for converting a voltage of a main battery into a lower voltage, which has a lower value than the voltage of the main battery, to be output;
   a junction box connected to an output terminal of the DC/DC converter;
   an auxiliary battery connected to the DC/DC converter via the junction box;
   a first relay for electrically connecting or disconnecting the junction box to or from the auxiliary battery;
   a jump-start power supply connection terminal connected to the DC/DC converter via the junction box;
   a second relay for connecting or disconnecting the junction box to or from the jump-start power supply connection terminal; and
   a controller configured to control the first relay, the second relay, and the DC/DC converter,
   wherein when the auxiliary battery is in a discharge condition, the controller turns off the first relay and simultaneously turns on the second relay,
   wherein after a vehicle starts by a power inputted through the jump-start power supply connection terminal, the controller turns off the second relay and turns on the first relay,
   wherein after the vehicle starts by the power inputted through the jump-start power supply connection terminal, the controller turns on a third relay, which is connected between the high voltage battery and the low voltage DC/DC converter, and controls an output of the DC/DC converter while controlling the DC/DC converter to continue outputting, and
   wherein after the second relay is turned off and the first relay and third relays are turned on, the controller limits a current supplied from the DC/DC converter to the auxiliary battery to be equal to or less than a threshold value in consideration of an open circuit voltage (OCV) of the auxiliary battery.

5. The vehicle power control system of claim 4, wherein the controller determines on and off states of the first relay and the second relay to be mutually exclusive.

6. A vehicle power control method for jump-start, comprising:
   a jump-start preparation step in which when an auxiliary battery is in a discharge condition, a first relay, which is connected between the auxiliary battery and an output terminal of a DC/DC converter, is turned off, and simultaneously, a second relay, which is connected between a jump-start power supply connection terminal and an output terminal of the DC/DC converter, is turned on;
   a jump-start completion step in which, after a vehicle starts using a power inputted through the jump-start power supply connection terminal, the second relay is turned off, and simultaneously, the first relay is turned on; and
   a current limitation step in which a current supplied from the DC/DC converter to the auxiliary battery is limited to be equal to or less than a threshold value in consideration of an open circuit voltage (OCV) of the auxiliary battery,
   wherein the jump-start completion step comprises a DC/DC converter control step in which a third relay, which is connected between a high voltage battery and the low voltage DC/DC converter, is turned on and an output of the DC/DC converter is controlled, and wherein in the DC/DC converter control step, the DC/DC converter is controlled to continue outputting.

7. A non-transitory computer-readable recording medium comprising computer executable instructions execution of which causes a controller to perform the vehicle power control method of claim 6.

8. A vehicle power control system for jump-start, comprising:
   a first relay connected between an auxiliary battery and an output terminal of a DC/DC converter, the first relay determining an electrical connection state between the auxiliary battery and the output terminal of the DC/DC converter;
   a second relay connected between a jump-start power supply connection terminal and an output terminal of the DC/DC converter, the second relay determining an electrical connection state between the jump-start power supply connection terminal and the output terminal of the DC/DC converter;
   a third relay connected between a main battery and the DC/DC converter; and
   a controller configured to control on and off states of the first relay and the second relay to be mutually exclusive based on a state of charge of the auxiliary battery and a vehicle ignition state through the jump-start, and to control an on and off state of the third relay,
   wherein when the auxiliary battery is in a discharge condition, the controller turns off the first relay and simultaneously turns on the second relay,
   wherein after a vehicle starts by a power inputted through the jump-start power supply connection terminal, the controller turns off the second relay and turns on the first and third relays, and controls an output of the DC/DC converter while controlling the DC/DC converter to continue outputting, and
   wherein after the second relay is turned off and the first and third relays are turned on, the controller limits a current supplied from the DC/DC converter to the auxiliary battery to be equal to or less than a threshold value in consideration of an open circuit voltage (OCV) of the auxiliary battery.

* * * * *